United States Patent [19]

Stargardter et al.

[11] 3,981,616
[45] Sept. 21, 1976

[54] HOLLOW COMPOSITE COMPRESSOR BLADE

[75] Inventors: Hans Stargardter, Bloomfield; Walter Pilpel, West Hartford, both of Conn.

[73] Assignee: The United States of America as represented by the Secretary of the Air Force, Washington, D.C.

[22] Filed: Oct. 22, 1974

[21] Appl. No.: 516,931

[52] U.S. Cl............................. 416/233; 416/226; 416/241
[51] Int. Cl.² ............................................ F01D 5/14
[58] Field of Search ..... 29/156.8, 156.8 R, 156.8 B, 29/156.8 H, 156.8 T; 416/229, 230, 248, 232, 233, 241, 241 A, 226

[56] References Cited
UNITED STATES PATENTS

| | | | |
|---|---|---|---|
| 2,848,192 | 8/1958 | Hayes | 416/233 |
| 3,058,202 | 10/1962 | Stalker | 416/233 UX |
| 3,073,568 | 1/1963 | Stalker | 416/233 |
| 3,095,180 | 6/1963 | Clarke et al. | 416/233 |
| 3,571,901 | 3/1971 | Sara | 416/241 UX |
| 3,600,103 | 8/1971 | Gray et al. | 416/230 X |
| 3,649,425 | 3/1972 | Alexander | 416/241 UX |
| 3,679,324 | 7/1972 | Stargardter | 416/229 |
| 3,699,623 | 10/1972 | Kreider | 416/241 X |
| 3,720,480 | 3/1973 | Plowman et al. | 416/230 X |
| 3,756,745 | 9/1973 | Alver et al. | 416/241 A X |
| 3,799,701 | 3/1974 | Rothman | 416/241 A X |
| 3,883,267 | 5/1975 | Baudier et al. | 416/230 |

Primary Examiner—Everette A. Powell, Jr.
Attorney, Agent, or Firm—Joseph E. Rusz; Jacob N. Erlich

[57] ABSTRACT

A hollow composite compressor blade having two airfoil-shaped half sections formed of composite material bonded together, one or more span members of metal or composite material bonded and integral therewith and an appropriate root structure. The composite material being preferably silicon carbide coated boron filament with an aluminum matrix for the shell.

2 Claims, 6 Drawing Figures

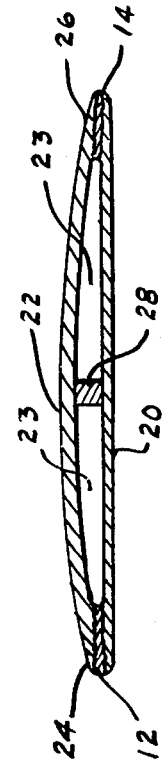
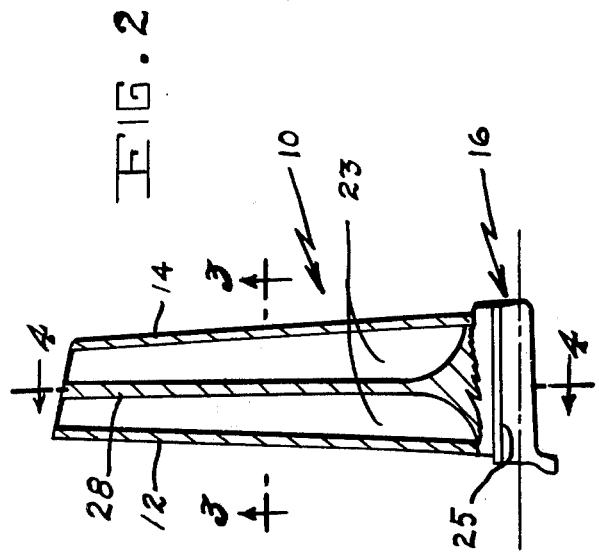
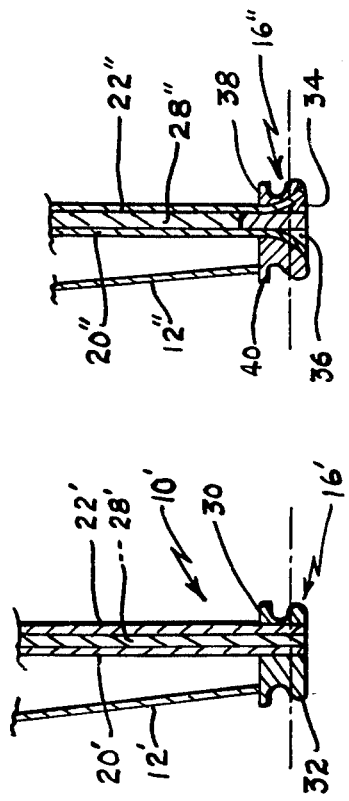
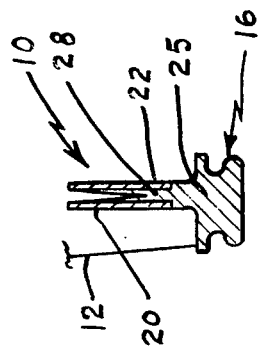

HOLLOW COMPOSITE COMPRESSOR BLADE

BACKGROUND OF THE INVENTION

This invention relates generally to compressor blades for gas turbine engines, and more particularly to a hollow composite blade structure which is durable, light in weight and of sufficient strength to render it free of flutter in operation.

Turbine engines have a variety of practical applications, the most important of which is in the field of aviation. In the propulsion of aircraft, the gas turbine power plant as a turbo prop or turbine jet engine has replaced the reciprocating engine in large, high speed aircraft. This change is due primary to its high power to weight ratio and its ability to be built in large horsepower sizes with high ratio of thrust per frontal area. In addition, turbine engines are useful in gas pipe line transmission, generating power in refineries and other industries as well as being useful in the marine transportation area and for the electric power generation.

A recent development in turbine blade construction has been the composite turbine or compressor blade. Such a composite blade, as those made from boron epoxy or boron aluminum tapes have been fabricated by building up the airfoil planform by compressing stacked layers of the tapes either with or without a core or spar. Once the planform had been established the entire unit would be set or cured in a well known manner. The problem encountered with the composite blade is that the blade is generally heavy and is highly expensive to manufacture due to the amount of material required to fabricate the same.

SUMMARY OF THE INVENTION

In this invention the problems set forth hereinabove have been overcome by a blade of suitable quality which is obtained by fabricating the airfoil shape in two half shell sections, and then bonding the halves to each other and to shaped structural spar members that are either integral with the root structure or bonded to shaped members that form the root structure. Laminated airfoil shaped half sections made up of radial and cross-ply layups of composite tape are joined to form the hollow airfoil portion of the blade. One or more radial spar members consisting of radial fiber layups are joined to the airfoil half sections to form a bridge structure within the hollow airfoil portion of blade to minimize deformation of the airfoil contour caused by gas loads during operation.

It is therefore an object of this invention to provide a hollow composite compressor blade structure that is extremely light in weight.

It is another object of this invention to provide a hollow composite compressor blade structure of sufficient stiffness to render it durable in service.

It is a further object of this invention to provide a hollow composite compressor blade structure which is economical to produce and which utilizes conventional, currently available components that lend themselves to standard mass producing manufacturing techniques.

For a better understanding of the present invention together with other and further objects thereof reference is made to the following description taken in connection with the accompanying drawing and its scope will be pointed out in the appended claims.

DESCRIPTION OF THE DRAWING

FIG. 2 is a profile view of the compressor blade of this invention broken away to show the leading edge, trailing edge and center spar structure;

FIG. 3 is a cross sectional view taken along line 3—3 of FIG. 2 of the compressor blade of this invention;

FIG. 4 is a partial sectional view of the root and spar structure of the compressor blade of this invention taken along line 4—4 of FIG. 2; and FIGS. 5 and 6 are partial sectional views of alternate root and spar structures taken along line 4—4 of FIG. 2.

DETAILED DESCRIPTION OF THE PREFERRED EMBODIMENTS

Figure 1:
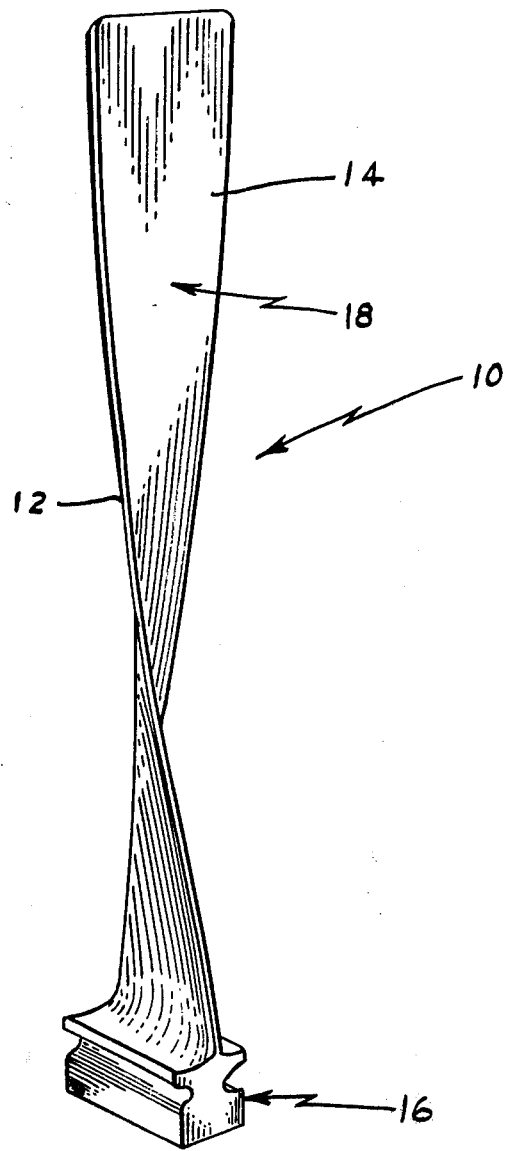
FIG. 1 is a pictorial illustration of the compressor blade of this invention.

Reference is now made to FIGS. 1–4 of the drawing which best show the compressor blade 10 of this invention. Blade 10 is of a typical airfoil contour having a leading edge 12, trailing edge 14 and root section 16. The outer shell 18 of blade 10 is fabricated from a composite material such as boron aluminum, boron epoxy or carbon epoxy material. While the preferred embodiment of this invention utilizes a BORSIC[R] aluminum tape consisting of a silicon carbide coated boron filament with an aluminum matrix for the shell, any of the other composite materials having a high tensile modulus in excess of about 20 million would be suitable.

The airfoil contour of blade 10 is formed of two separate composite panels 20 and 22 leaving a cavity 23 therebetween. Each panel 20 and 22 is made up of any suitable multilayer composite consisting of radial and cross-ply layups of BORSIC-aluminum tape. After the two panels 20 and 22 are preformed into the desired airfoil shape, they are joined together at the leading and trailing edges, 12 and 14, respectively, by any suitable bonding technique. Aluminum foil or metal inserts 24 and 26 can be utilized at the juncture of piles at the leading and trailing edges 12 and 14 as additional support structure and to provide protection from foreign object damage as shown in FIG. 3.

Additional stiffness and support is provided to blade 10 by a center spar 28 which is formed from any suitable material such as an aluminum alloy or composite material and bonded to airfoil panels 20 and 22 by any suitable securing method as shown in FIG. 3. The root structure 16 is a one piece root and spar construction as shown in FIGS. 1–4 with spar 28 integral with root member 25. In such a construction as shown in FIG. 4, spar 28 runs the longitudinal length of blade 10 having a V-shaped configuration adjacent the top section thereof, thereby adding considerable strength to the lightweight blade structure of this invention.

FIGS. 5 and 6 show a multipiece root and spar construction. In referring to these figures identical numerals will be used to identify elements which also appear in FIGS. 1-4, with a prime or double prime used with modified elements. For example, the spar 28' utilized with blade 10' of FIG. 5 is separate from root attachment members 30 and 32. In this construction the center spar 28' and airfoil panels 20' and 22' extend into and are bonded within root attachment members 30 and 32 to form root structure 16'. An additional root configuration is shown in FIG. 6. Such an arrangement is made up of splayed skins (airfoil halves 20" and 22″), wedges 34 and 36, a two piece center spar 28″, and root attachment members 38 and 40, all of which are bonded together to form the root structure 16″.

Although this invention has been described with reference to particular embodiments it will be understood to those skilled in the art that this invention is also capable of a variety of alternate embodiments within the spirit and scope of the appended claims.

We claim:

1. A hollow composite compressor blade having an airfoil planform comprising a root section, a pair of upstanding panels made of composite material extending from said root section, said panels forming a cavity therebetween, said panels having an insert located between adjacent panels at the leading edge of said blade and an insert located between adjacent panels at the trailing edge of said blade for securely joining said panels together, a central spar made of composite material and being of unitary construction with and extending in the longitudinal direction from said root section intermediate said panels, said spar terminating in a V-shaped configuration in said longitudinal direction, said V-shaped configuration having a pair of sides and a base, the sides of said V-shaped configuration being in direct contact with said pair of upstanding panels and the base of said V-shaped configuration being located substantially midway between said pair of panels in the transverse direction thereby providing a lightweight, extremely strong blade structure.

2. A hollow composite compressor blade having an airfoil planform as defined in claim 1 wherein said composite material is made of a silicon carbide coated boron filament with an aluminum matrix.

* * * * *